United States Patent [19]

Moshier

[11] 4,096,736
[45] Jun. 27, 1978

[54] ULTRASONIC LEAK HOLE DETECTION APPARATUS AND METHOD

[75] Inventor: Gary S. Moshier, North Haledon, N.J.

[73] Assignee: American Can Company, Greenwich, Conn.

[21] Appl. No.: 772,330

[22] Filed: Feb. 25, 1977

[51] Int. Cl.² ............................................. G01M 3/24
[52] U.S. Cl. ................................... 73/40; 73/45.1; 209/111.9
[58] Field of Search ................. 73/40, 40.5 A, 51, 45, 73/45.1, 45.2, 45.4, 49.2; 209/111.9

[56] References Cited

U.S. PATENT DOCUMENTS

| | | | |
|---|---|---|---|
| 3,266,296 | 8/1966 | Hall | 73/40.5 A X |
| 3,399,563 | 9/1968 | Helms | 73/40.5 A X |
| 3,499,314 | 3/1970 | Roberts et al. | 73/45.2 |
| 3,792,606 | 2/1974 | Munger | 73/45.1 X |
| 3,795,137 | 3/1974 | Lo et al. | 209/111.9 X |
| 3,875,790 | 4/1975 | Herdzina et al. | 73/40 |

Primary Examiner—Richard C. Queisser
Assistant Examiner—Joseph W. Roskos
Attorney, Agent, or Firm—Robert P. Auber; Ira S. Dorman; Douglas W. Wyatt

[57] ABSTRACT

A leak detecting device for identification of can tops and similar workpieces with leak holes has a compressed gas supply chamber providing a source of compressed gas for testing the workpieces for leaks. An acoustic testing chamber is mounted adjacent the gas supply chamber. A sealing press is provided between the chambers for holding a workpiece in a gas tight manner so that one side of the workpiece faces the compressed gas supply chamber in a gas tight relationship and the other side of the workpiece faces the acoustic testing chamber in a noise tight relationship. A valve is provided on the compressed gas supply chamber and is operable to admit compressed gas from the gas supply chamber to the side of said workpiece facing the compressed gas supply chamber. An ultrasonic microphone is disposed within the acoustic testing chamber and is adapted for detecting gas noise created by gas passing through a leak hole in the workpiece. A gas venting port is disposed adjacent the periphery of the microphone and communicates with a labyrinth baffle with a gas vent passage leading to the atmosphere. An electrical control receives gas leak noise signals from the microphone after the valve has opened and rejects workpieces giving off gas leak noise signals.

12 Claims, 4 Drawing Figures

ULTRASONIC LEAK HOLE DETECTION APPARATUS AND METHOD

BACKGROUND OF THE INVENTION

The present invention relates to an ultrasonic inspection leakage detection system and more particularly to such a system which is adapted to detect leaks at a high rate of inspection.

At present, leakage detection systems of various types are used to find leakage from gas-filled containers. In one sensitive leakage detector system the container is filled with helium gas under pressure and leaks are detected by a sensitive instrument such as a gas mass spectrometer. That type of leakage detection is relatively slow and expensive and may not be suitable for testing parts produced at a high rate of production. In another widely used system a fluid, such as compressed air, is pumped into a container and the container submerged in water. An operator looks for bubbles and rejects those containers which show leakage. That system is relatively slow and dependent upon the attentiveness and diligence of the operators.

It has also been suggested that a fluid, such as compressed air, be applied in bursts to one side of a part and an ultrasonic microphone be located on the other side of the part. The microphone detects the high frequency — 20,000 - 50,000 Hz — sound of the air escaping through small holes in the part being tested. It is necessary in a noisy factory environment to locate the microphone in a chamber to prevent the factory noise, which may be in the same ultrasonic frequency range, from appearing, to the microphone, to be a leaking part.

A major difficulty with that type of ultrasonic leakage detection system is that it is relatively slow compared to the high production rates possible in parts production. For example, the can ends or can tops of the "pull tab" type consisting of a stamped can end having a pull tab with a ring and a scored area for forming an opening may be produced at 400 per minute. The prior leakage inspection systems have been slower than that rate of production, for example, a maximum speed of inspection of about 100 can tops per minute. The alternatives are (i) to inspect only one can top out of three — which is not desirable as each can top should be individually inspected for leakage or (ii) to provide three or more inspection machines for each production machine. The second alternative is also not desirable because of the expense in installation, repair, maintenance and operation associated with a plurality of inspection machines and the complexity of the conveyor and control systems associated with a plurality of inspection machines.

A number of prior U.S. patents have suggested various types of ultrasonic inspection systems. However, none of these systems, it appears, is able to detect leaks in parts at a high rate of speed of 400 parts per minute.

U.S. Pat. No. 3,399,563 to Helms detects leaks in can ends using exterior pressure against the can end and a microphone within a chamber. The chamber is "hermetically sealed" (col. 4, line 44) and not vented. Helms suggests that a liquid be applied to the can end to enhance leak noise.

U.S. Pat. No. 3,792,606 to Munger describes a leak detector in which a chamber is employed to reduce background noise. The chamber is hermetically sealed (col. 2, line 51; col. 4, line 33). Munger utilizes a screen to enhance leak noise.

U.S. Pat. No. 3,795,137 to Lo describes a method for testing aerosol cans for leaks. The can is formed, filled and sealed and tested for leaks due to internal pressure. The testing devices uses a circular table with can spaces created by metal blocks on the peripheral portion. As the table turns, the can enters a tunnel which, at the halfway point, has a microphone recessed in an alcove. The tunnel is not sealed as there are entrance and exit openings and also a "clearance" between the table and the tunnel. The openings provide for can access to the test area while the clearance permits table rotation.

U.S. Pat. No. 3,224,252 to Hamilton is directed to testing containers for leaks and supplies internal pressure to the container to be tested. A pressure equilibrium is established between the container and a "sound box." A container leak will cause gas to flow, vibrating a reed, the vibrations being detected by a microphone.

U.S. Pat. No. 3,266,296 to Hall describes three methods for inspecting angular work pieces (such as automobile rims). First, a chamber is created about the exterior of the rim using an inflatable rubber seal. Leak noise is detected by a microphone in the interior of the rim. Secondly, two sealing plates are applied to the inside and outside faces of the rim and pressure is applied through the interior of the rim. Any leaks are detected by a microphone outside the rim. Thirdly, a closed chamber is formed through inflatable seals around both the interior and the exterior of a selected portion of the rim and the microphone is within the sealed chamber.

None of the above-discussed prior art patents utilize the apparatus or method of the present invention, in which the sound wave caused by the flexing of a part under test is dissipated, before the microphone is activated, by venting through an acoustically isolating structure.

SUMMARY OF THE INVENTION

In accordance with the present invention, an ultrasonic leakage detector and method of detecting leaks are provided which are capable of inspecting parts at a high rate of speed. The detector includes a conveyor belt which, in indexed steps, brings the parts under the orifice of a chamber. Each part, which may be an assembled pull-tab can top, is lifted by a lift mechanism so that the part seals the chamber orifice. Compressed air is introduced beneath the part, bulging its center portion upwardly into the chamber and creating a pressure wave. The pressure wave is dissipated without disturbing the ultrasonic microphone within the chamber by means of a series of venting passageways through the microphone housing. Those passageways lead to a cavity which is vented by means of a foam-filled plate labyrinth (baffles) leading to bores through the walls of the chamber. The foam material and baffles acoustically isolate the microphone and prevent factory noise from disturbing the microphone. The parts may be inspected at a high rate of speed, for example, 400 parts per minute, by using a timing mechanism which coordinates the lifting mechanism to seal the parts against the chamber orifice, the opening of a valve controlling the burst of compressed air, the turning "on" of the microphone that listens for leakage, and releasing the part from the chamber orifice. The microphone can also pick up noise received when an upper portion of a can top is deformed so that a noise seal is not achieved. Such can tops are also rejected.

OBJECTIVES AND FEATURES OF THE INVENTION

It is an objective of the present invention to provide an ultrasonic fluid leak detector which is capable of inspecting parts at a high rate so that it may be utilized with high production rate part-making machinery.

It is a further objective of the present invention to provide such a leak detector which may be used in a noisy factory without loss of accuracy in detecting leaks.

It is a further objective of the present invention to provide such a leak detector which may be adapted to test the ends of cans for leakage and which will consistently detect leaks as small as 0.001 inch in diameter.

It is a further objective of the present invention to provide such a leak detector which may be adapted to test the pull-tab top ends of cans and which will operate at a sufficiently high rate of speed, for example, 400 can ends per minute, so that each can end may be individually inspected and only one such leak detector is required for each can end production machine.

It is a further objective of the present invention to provide such a leak detector which is sufficiently rugged so that it may be used in the environment of a can-making factory and sufficiently simple so that it may generally be repaired or adjusted by non-engineering personnel.

BRIEF DESCRIPTION OF THE DRAWINGS

Other objects and advantages of this invention will be apparent from the detailed description, claims and drawings wherein:

DETAILED DESCRIPTION OF THE INVENTION

Figure 1:
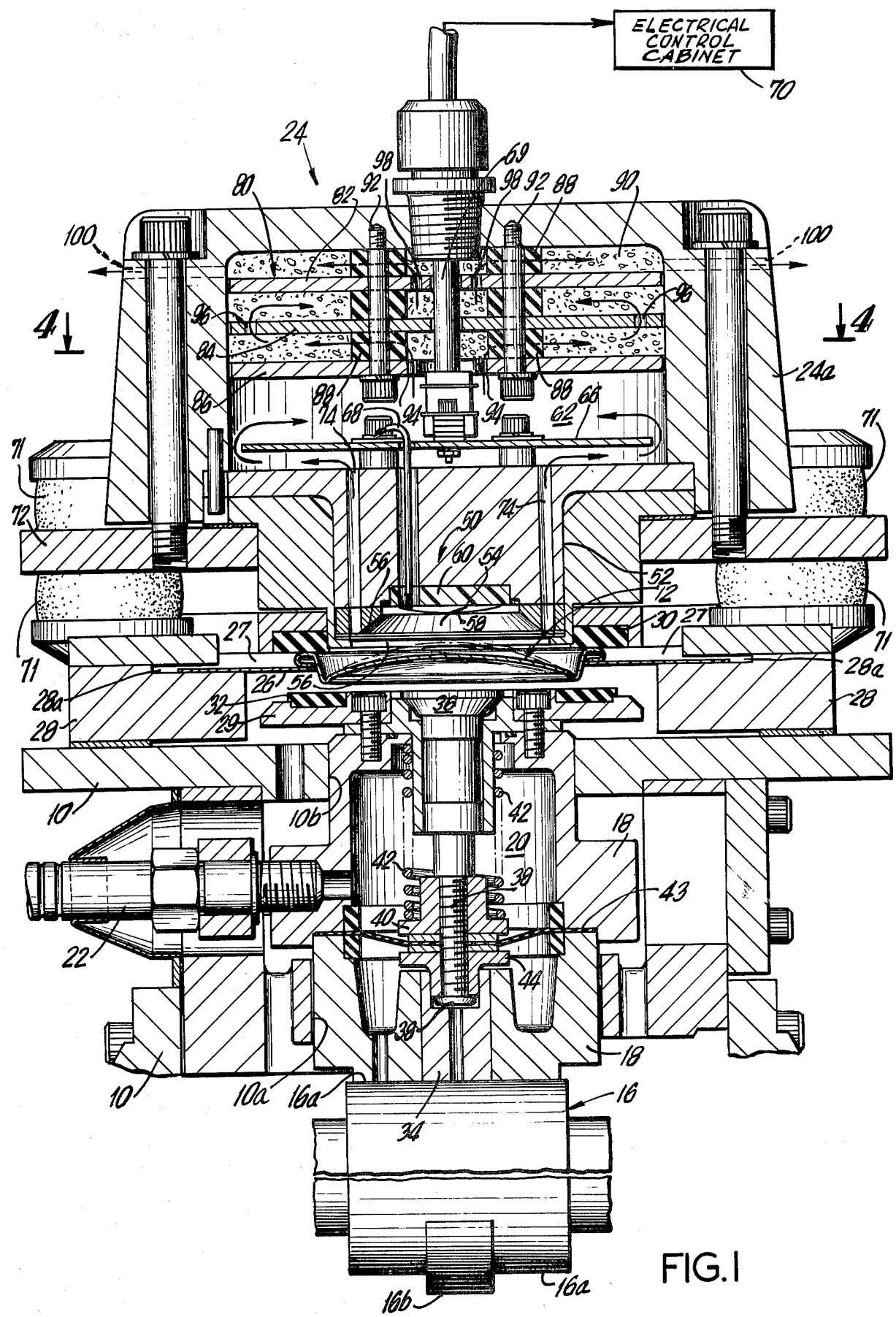
FIG. 1 is a transverse cross-sectional view of the acoustic leak detector for can tops of the present invention.

Referring now in detail to the drawings, the leak detector for can tops or similar workpieces is mounted on a base support 10 as illustrated in FIG. 1. In order to operate the apparatus of the leak detector, a power-driven shaft (not shown) is rotatably mounted on the base 10 and has a cam 16 mounted for rotation therewith for intermittent actuation of the leak detector apparatus.

Directly above the cam 16 is an air chamber housing 18 slideably mounted for vertical movement on the base 10. The air chamber housing 18 forms a lower test chamber for the leak detector. The moveable housing 18 has an air chamber 20 formed therein for receiving compressed air used to detect the leaks in the can tops. The compressed air for testing flows into the chamber 20 through an air inlet tube 22 which is connected on its outer end with a supply (not shown) of compressed air at about 60 p.s.i. and on its inner end with the air chamber 20.

Directly above the air chamber housing 18 is a sound detection acoustic housing 24 mounted on the base support 10. The acoustic housing 24 forms an upper test chamber for the leak detector. The acoustic housing 24 and the air chamber housing 18 have an elongated passage 27 provided therebetween through which the can tops 12 are intermittently transported on a steel belt 26. The transport belt 26 operates in an intermittent manner to place a can top 12 in a position to be tested between the housings 18 and 24 at predetermined intervals. The transport belt 26 is guided through the passage 27 by a pair of opposed belt guides 28 mounted on the base support 10. The belt guides 28 each have opposed guide slots 28a which receive and support opposite sides of the transport belt 26.

In order to hold a can top 12 in position for leak detection, a disc shaped lifting head 29 is mounted on top of the vertically movable air chamber housing 18. Intermittent lifting movement with a dwell period to hold the head 29 in the upper testing position is imparted to the air chamber housing 18 and the lifting head 29 by cam surface 16a. The air chamber housing 18 is supported for vertical sliding movement by guide surfaces 10a and 10b formed by portions of the base support 10.

Upward movement of the air chamber housing 18 brings the lifting head 29 into engagement with a can top 12 to be tested on the transportation belt 26. The air chamber housing 18 is moved upwardly approximately ¼-inch by the cam surface 16a at each stroke. The upward movement of the lifting head 29 forces the outer annular edge of the can top 12 into air tight engagement with a mating annular brass seal 30 on the under side of acoustic housing 24. A similarly configured annular polyurethane seal 32 on the lifting head 29 engages the underside of outer annular edge of the can top in an air tight manner. While the lifting head 29 remains in its upward position illustrated in FIG. 2, the seals 30 and 32 hold the can top in an air tight manner around the outer edge of the can top 12. Thus, air can only pass from the underside of the can top to the upper side by passing through a leak hole in the can top.

After the can top 12 has been moved into an air tight testing position by the lifting head 29, a second cam surface 16b subsequently actuates a valve lifter 34 which, in turn, lifts the air valve 36 approximately ⅛-inch to allow air under pressure to flow from the air chamber 20 to the underside of the can top 12 being tested. The valve 36 has a downwardly extending stem 38 which is engaged by the valve lifter 34. The valve stem 36 has an upper collar 40 fixed thereon near its lower end which is engaged by the lower end of a spring 42 positioned about the valve stem 38. The upper end of the spring 42 is disposed in a recess in a portion of the air chamber housing 18. The spring 42 functions to bias the valve 36 into the closed position. A deformable diaphragm 43 is provided above the valve stem 38 to seal the air chamber 20 from the underlying cam mechanism 16. A lower collar 44 and the upper collar 40 seal the diaphragm about the valve stem 38 which moves vertically when actuated by the cam surface 16b.

Figure 2:
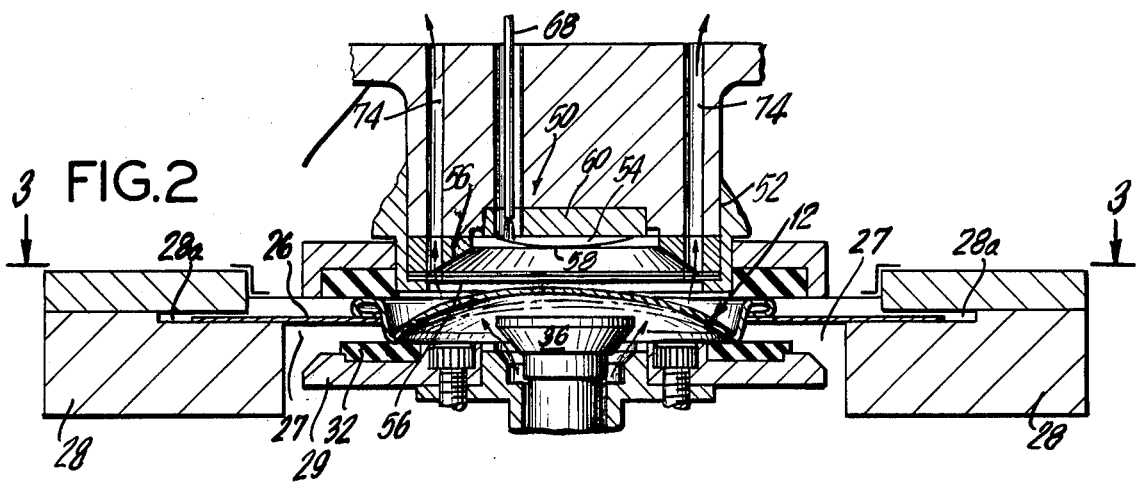
FIG. 2 is a cross-sectional view of a portion of the acoustic leak detector of FIG. 1 illustrating the position of the parts with the air inlet valve in the open position.
Figure 3:
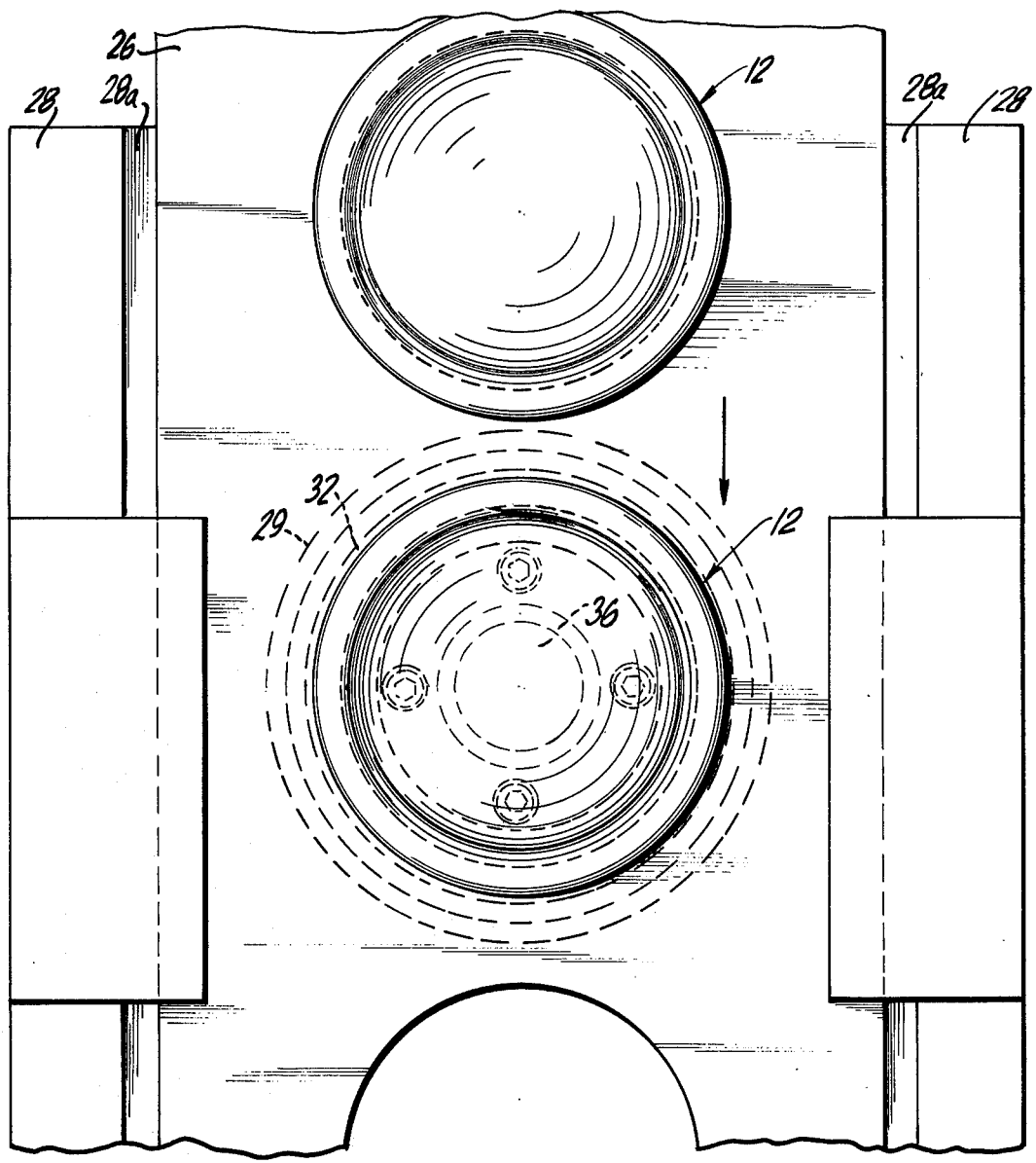
FIG. 3 is a top view taken along line 3—3 of FIG. 2 and illustrating the workpiece can tops within the transportation belt for intermittent movement into testing position within the leak detector of FIG. 1.
Figure 4:
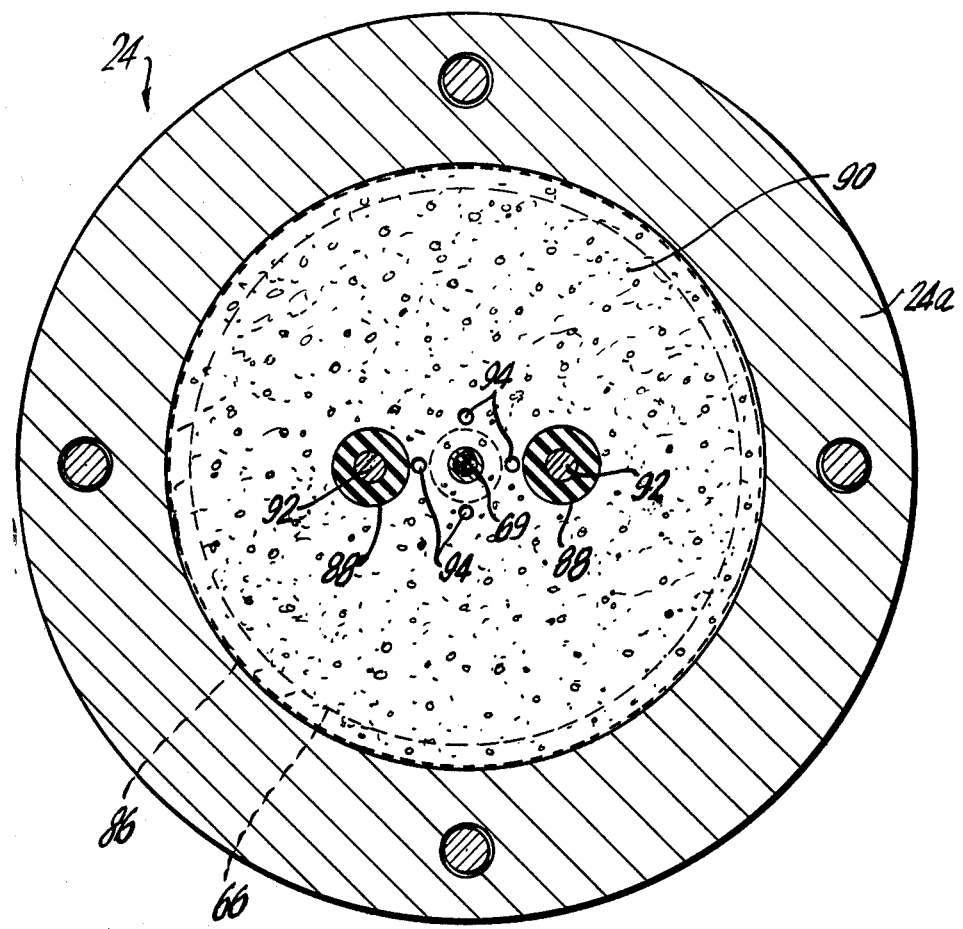
FIG. 4 is a top cross-sectional view taken along line 4—4 of FIG. 1 and illustrates a portion of the acoustic baffle.

When the air valve 36 is opened by movement of cam surface 16b as illustrated in FIG. 2, compressed air at 60 p.s.i. is directed against the underside of the can top 12. As shown in dotted line in FIG. 1 and in full line in FIG. 2, the can top flexes or bows upwardly under the pressure of the compressed air. When there is a hole in the can top 12 that would cause a leak when in use, compressed air will escape through the leak hole into the acoustic housing and make a sound indicating that the can top is defective.

To detect the sound of compressed air escaping from a leak hole in the can top, a condenser microphone 50 is mounted in the acoustic housing and positioned directly above the can top 12. The microphone 50 is mounted within an inner cylindrical microphone housing 52 mounted within the acoustic housing 24. The microphone housing 52 provides a microphone air chamber 54 between the microphone 50 and the adjacent can top 12.

The microphone 50 has a downwardly directed movable diaphragm 58 and a sensitivity increasing screen 56 spaced downwardly therefrom between the microphone 50 and the adjacent can top 12. An insulating disk 60 is positioned on the upper side of the microphone 50 to isolate the microphone electrically.

Above the cylindrical microphone housing 52, a preamplifier air cavity 62 is formed by a cylindrical canister portion 24a of the acoustic housing 24. A preamplifier 66 is positioned horizontally in the preamplifier air cavity 62 and is mounted on the microphone housing 52. Electrical signals pass from the microphone 50 by electrical conductor 68 placed in a bore hole in the microphone housing 52 to the preamplifier 66. After preamplification, the signals pass to a coaxial cable 69 passing out through the upper portion of the canister portion 24a of the acoustic housing 24 to outside detection and recording apparatus in an electrical control cabinet 70.

To isolate the microphone from extraneous outside noise, damping pads 71 separate the upper cylindrical canister portion 24a of acoustic housing 24 and the top plate portion 72 from base 10 to quench acoustic vibrations and minimize undesirable noise caused by outside sounds and vibrations.

In order to attenuate an air pressure pulse or wave caused by flexing of the can top 12 when compressed air is applied to its under surface and to relieve air pressure caused by air leakage through the can top, this invention advantageously provides a plurality of venting ports 74 about the periphery of the microphone air chamber 54. The venting ports 74 are formed in the microphone housing 52 and provide an air passage upwardly through the housing to the preamplifier air cavity 62. There may be four or more venting ports 74 in spaced relationship displaced about the microphone air chamber 54.

Directly above the preamplifier air cavity 62, the interior of the cylindrical canister portion 24a of the acoustic housing contains a labyrinth baffle generally designated by the numeral 80. The labyrinth baffle 80 consists of three spaced horizontal disk-shaped plates 82, 84 and 86 which conform to the interior of the housing canister 24a. The plates of the baffle 80 are separated by spacers 88 and have dispersed between them acoustical polyurethane foam 90. The labyrinth baffle 80 is retained in position in the top of the baffle housing canister 24a by baffle retaining bolts 92.

The lower baffle plate 86 has a plurality of venting ports 94 disposed near its center portion adjacent the coaxial cable 69. The middle baffle plate 84 has a plurality of venting ports 96 disposed adjacent its periphery and spaced from the venting ports 94 on the lower baffle plate 86. Similarly, the top baffle plate 82 has a plurality of venting ports 98 disposed near its center portion adjacent the coaxial cable 69 and spaced inwardly from the venting ports 96 on the middle baffle plate 84. Thus, as may be seen from FIG. 1, an air pressure wave created by the flexing of the can top 12 and air pressure created in the microphone air chamber 54 by a leak in a can top can be vented upwardly through the venting ports 74, spaced about the microphone air chamber 54. The vented air received in the preamplifier air cavity 62 then passes upwardly through the labyrinth baffle 80 where the air is then free to pass out to the atmosphere through vent passage 100.

OPERATION OF THE LEAK DETECTOR

In operation of the can top leak detector, the transport belt 26 intermittently indexes a can top 12 into testing position in the passage 27 directly above the lifting head 29. The cam 16 then causes the cam surface 16a to raise the air chamber housing 18 and lifting head 29 whereby the can top 12 is held in an air tight manner between the seal 30 on the acoustic housing 24 and the seal 32 on the lifting head 29. The cam surface 16b then raises the valve lifter 34 causing the air valve 36 to open, whereby compressed air is introduced to the underside of the can top 12. The operation of the transport belt 26, the cam 16, and the electrical control cabinet 70 are synchronized to operate on an intermittent basis.

The air pressure wave formed by the upward flexing of the can top 12 due to the compressed air introduced on its underside is rapidly attenuated upwardly through the vent ports 74 in the microphone housing 52. The vented air then passes upwardly through the labyrinth baffle 80 and out to the atmosphere through the venting passage 100 formed in the acoustic housing 24. Failure to rapidly attenuate this air pressure wave causes an overloading of the microphone 50 making the microphone inoperative for a relatively long duration of time. The relatively long period of time required for the microphone to recover from an unattenuated air pulse and then subsequently detect noise made by an air leak substantially slows down the operational speed of the leak detection machine.

In addition, the rapid venting by the ports 74 and baffle 80 prevents a rapid build up of air pressure in the microphone air chamber 54 due to a relatively large leak hole in the can top 12. A rapid build up of air pressure in the microphone air chamber 54 would allow the pressure on either side of the can top 12 to equalize. Equalization of pressure differential eliminates the detectable noise of air passing through the leak hole.

The electrical control panel does not begin to listen for air leak noise from the microphone 50 until approximately 20 to 30 milliseconds after the valve 36 has been opened. The apparatus of the electrical control cabinet 70 is synchronized with the opening of the air valve 36 so that the noise from the microphone 50 is not registered as an air leak noise signal until the set time delay after opening of the valve 36. After the time delay, the pressure wave created by the upward flexing of the can top has been effectively dissipated so that the pulse wave is not recorded as a leak signal, and the microphone 50 has not been overloaded and made temporarily inoperative.

After the lapse of 20 to 30 milliseconds from the opening of the valve 36, the electrical control panel records and stores any air leak noise signals received from the microphone 50. Subsequently, the electrical control cabinet uses the stored air noise signal to cause the can top 12 for which a leak noise has been recorded to be rejected down stream by apparatus not shown.

The microphone 50 can also pick up noise received when an upper portion of a can top 12 is deformed so that a noise seal is not achieved with the brass seal 30. Such deformed can tops are also rejected.

The apparatus disclosed herein for operating the lifting head 29 and the valve 36 is not considered to be a part of the present invention and is disclosed here for the purpose of describing an operational device to one skilled in the art. Conventional mechanical or electrical apparatus may be used to perform the function of raising the sealing head 29 and opening and closing the air valve 36. Similarly, the apparatus of the control cabinet for recording air leak noise signals from the microphone after a short time delay from the opening of the air valve may be for conventional electrical or electronic controls which are synchronized with the actuation of the air valve 36.

Having thus described my invention, I claim:

1. A leak detecting device for identification of can tops and similar workpieces with leak holes comprising a compressed gas supply chamber providing a source of compressed gas for testing the workpieces for leaks; an acoustic testing chamber mounted adjacent said gas supply chamber; sealing means between said chambers for holding a workpiece in a gas tight press wherein one side of the workpiece faces said compressed gas supply chamber in a gas tight relationship and the other side of said workpiece faces said acoustic testing chamber in a noise tight relationship; valve means on said compressed gas supply chamber, said valve means being operable to admit compressed gas from said gas supply chamber to the side of said workpiece facing said compressed gas supply chamber; an ultrasonic microphone within said acoustic testing chamber adapted for detecting gas noise created by gas passing through a leak hole in the workpiece; a gas venting port disposed adjacent the periphery of said microphone and communicating with a labyrinth baffle with a gas vent passage leading to the atmosphere; and electrical control means for receiving gas leak noise signals from said microphone after said valve means has opened and for rejecting workpieces giving off gas leak noise signals.

2. The leak detecting device of claim 1 wherein said ultrasonic microphone has a plurality of said gas venting ports disposed about the periphery of said microphone in spaced relationship, and wherein said gas venting ports extend upwardly through a microphone housing to a gas cavity within the interior of said acoustic testing chamber, and wherein said labyrinth baffle is provided within the upper portion of said acoustic chamber, said labyrinth baffle having a plurality of spaced-apart plates, each of said plates having nonaligned venting ports providing a labyrinth path for venting air from said gas cavity to the atmosphere through said vent passage.

3. The leak detecting device of claim 2 wherein said ultrasonic microphone is disposed adjacent the lower portion of said microphone housing and wherein a microphone gas chamber is formed in the lower end of the microphone housing between the microphone and the workpiece to be tested.

4. The leak detecting device of claim 3 wherein said sealing means comprises a lifting head with an annular seal adapted to engage the outer periphery of the underside of the workpiece in cooperation with an adjacent annular seal disposed in cooperating relationship on the underside of the acoustic testing chamber, said annular seals forming a gas tight press for supporting said workpiece.

5. The leak detecting device of claim 4 wherein said acoustic testing chamber has an outer canister-shaped portion with a cylindrical-shaped microphone housing therein, and wherein said baffle plates are disk-shaped members disposed in the upper portion of said canister housing and wherein said disk-shaped members have noise dampening foam disposed therebetween.

6. A leak detecting device for identification of can tops and similar workpieces with leak holes comprising a compressed air supply chamber providing a source of compressed air for testing the workpieces for leaks; an acoustic testing chamber mounted adjacent said air supply chamber; sealing means between said chambers for holding a work piece in an air tight press wherein one side of the workpiece faces said compressed air supply chamber in an air tight relationship and the other side of said workpiece faces said acoustic testing chamber in a noise tight relationship; an air valve mounted on said compressed air supply chamber, said valve being operable to admit compressed air from said air supply chamber to the side of said workpiece facing said compressed air supply chamber; an ultrasonic microphone within said acoustic testing chamber adapted for detecting air noise created by air passing through a leak hole in the workpiece; a plurality of air venting ports disposed about the periphery of said microphone in spaced relationship and communicating with a labyrinth baffle, said labyrinth baffle being formed by a plurality of spaced apart plates with nonaligned air vent passages; and electrical control means for receiving air leak noise signals from said microphone after said valve means has opened and for rejecting workpieces giving off air leak noise signals.

7. The leak detecting device of claim 6 wherein said plurality of said air venting ports disposed about the periphery of said microphone extend upwardly through a microphone housing to an air cavity within the interior of said acoustic testing chamber.

8. The leak detecting device of claim 7 wherein said ultrasonic microphone is disposed adjacent the lower portion of said microphone housing and wherein a microphone air chamber is formed in the lower end of said microphone housing between said microphone and the workpiece to be tested.

9. The leak detecting device of claim 8 wherein said sealing means comprises a lifting head with an annular seal adapted to engage the outer periphery of the underside of the workpiece in cooperation with an adjacent annular seal disposed in cooperating relationship on the underside of the acoustic testing chamber, said annular seals forming an air tight press for supporting said workpiece.

10. The leak detecting device of claim 9 wherein said acoustic testing chamber has an outer canister-shaped portion with a cylindrical-shaped microphone housing therein, and wherein said baffle plates are disk-shaped members disposed in the upper portion of said canister-shaped housing and wherein said disk-shaped members have noise dampening foam disposed therebetween.

11. A method for detecting leak holes in can tops and similar workpieces comprising the steps of:
 (a) transporting a workpiece into a leak detection position between an acoustic chamber and a gas supply chamber;
 (b) sealing the peripheral edges of the workpiece in a gas tight press so that one side of the workpiece is exposed only to gas in the acoustic chamber and the other side of the workpiece is exposed only to gas in the gas supply chamber;

(c) opening a gas valve and allowing compressed gas from said gas supply chamber to communicate with the side of said workpiece facing said gas supply chamber;

(d) attenuating the gas pressure wave created in the acoustic chamber by the flexing of the workpiece by the compressed gas in step (c) above through venting ports and then passing the vented gas out to the atmosphere through labyrinth baffle;

(e) after a short time delay from the opening of the gas valve, detecting with an ultrasonic microphone any gas leak noise created by gas passing through a hole in the workpiece into the acoustic chamber;

(f) transmitting any gas leak noise signal from the microphone to control apparatus; and (g) rejecting the workpiece for which a gas noise signal has been recorded by the control apparatus.

12. A method for detecting leak holes in can tops and similar workpieces comprising the steps of:

(a) transporting workpieces in an intermittent manner on a belt into a leak detection position between an acoustic chamber and an air supply chamber;

(b) moving a lifting head into contact with a workpiece to be tested and sealing the peripheral edges of the workpiece in an air tight press so that one side of the workpiece is exposed only to air in the acoustic chamber and the other side of the workpiece is exposed only to air in the air supply chamber;

(c) opening an air valve and allowing compressed air from said air supply chamber to communicate with the side of said workpiece facing said air supply chamber;

(d) attenuating the gas pressure wave created in the acoustic chamber by the flexing of the workpiece by the compressed air in step (c) and venting any air from a leak hole through a plurality of venting ports adjacent a detecting ultrasonic microphone and then passing the vented air out to the atmosphere through a labyrinth baffle;

(e) silencing any outside factory noise coming into the acoustic chamber through the atmospheric vent by sound dampening foam in the labyrinth baffle.

(f) after a short time delay from the opening of the air valve, detecting with the ultrasonic microphone any air leak noise created by air passing through a leak hole in the workpiece into the acoustic chamber or noise received because of a deformed can top;

(g) transmitting any noise signal from the microphone to control apparatus; and (h) rejecting of the workpiece for which a noise signal has been received by the control apparatus from the ultrasonic microphone.

* * * * *